US012724756B1

(12) United States Patent
Busey et al.

(10) Patent No.: US 12,724,756 B1
(45) **Date of Patent: *Sep. 1, 2026**

(54) SYSTEMS AND METHODS FOR MONITORING AND MANAGING VERSIONING CHANGES TO COMPUTATIONAL WORKFLOWS

(71) Applicant: Form Bio Inc., Austin, TX (US)

(72) Inventors: Andrew Busey, Austin, TX (US); Douglas James Daniels, Jr., Austin, TX (US); Brandi Lynn Cantarel, Richardson, TX (US)

(73) Assignee: Form Bio Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/083,852

(22) Filed: Mar. 19, 2025

Related U.S. Application Data

(63) Continuation of application No. 17/949,748, filed on Sep. 21, 2022, now Pat. No. 12,282,467.

(51) Int. Cl.
*G06F 16/21* (2019.01)
*G06F 16/23* (2019.01)

(52) U.S. Cl.
CPC ........ *G06F 16/219* (2019.01); *G06F 16/2379* (2019.01)

(58) Field of Classification Search
CPC ........................... G06F 16/219; G06F 16/2379
See application file for complete search history.

(56) References Cited

U.S. PATENT DOCUMENTS

| | | | | |
|---|---|---|---|---|
| 10,545,951 | B1 * | 1/2020 | Lieberman | G06F 16/258 |
| 2007/0094248 | A1 * | 4/2007 | McVeigh | G06F 16/958 |
| 2022/0122038 | A1 * | 4/2022 | Duan | G06Q 10/0633 |

* cited by examiner

*Primary Examiner* — Apu M Mofiz
*Assistant Examiner* — Oscar Wehovz
(74) *Attorney, Agent, or Firm* — Esplin & Associates, PC

(57) ABSTRACT

Exemplary implementations for managing computational workflows may: store a workflow repository and a user repository; monitor the workflow repository to detect changes to computational modules included in the workflow repository; responsive to detections of changes to the computational modules, identify computational workflows defined by workflow definitions impacted by the detected changes; identify, based on information included in the user repository, users associated with the identified computational workflows; manage information defining user interfaces associated with individual users; update information defining the user interfaces based on the detected changes and the identified users; effectuate presentation of the user interfaces to the users; and/or perform other steps.

20 Claims, 3 Drawing Sheets

SYSTEMS AND METHODS FOR MONITORING AND MANAGING VERSIONING CHANGES TO COMPUTATIONAL WORKFLOWS

FIELD OF THE DISCLOSURE

The present disclosure relates to systems and methods for monitoring and managing versioning changes to computational workflows caused by ongoing development of computational modules implemented within the computational workflows.

BACKGROUND

Methods for customizing computational workflows are known. Bioinformatics programs for converting between file types and/or formats, performing analyses on biological data, and/or performing other functions are known. Methods for updating software are known.

SUMMARY

Computational modules may be selected and/or arranged to customize a computational workflow for processing information. The computational modules may be selected and/or arranged in a relative order that defines the computational workflow and/or the order of operations that are performed on inputs to the computational workflow. Updates to computational workflows may become available after the computational workflows have been used to process inputs to produce outputs. The updates to the computational workflows may include updates to the computational modules included in the computational workflows and/or other components of the computational workflows. The updates may provide improvements by modifying (i.e., providing new versions of) the computational workflows and/or altering the way inputs are processed by the computational workflows. Therefore, there is a need to monitor and manage the computational workflows and swiftly notify users when updates to the computational workflows have been implemented and/or become available.

One or more aspects of the present disclosure include a system for monitoring and managing versioning changes to computational workflows caused by ongoing development of computational modules implemented within the computational workflows. The system may include electronic storage, one or more hardware processors configured by machine-readable instructions and/or other components. Executing the machine-readable instructions may cause the one or more hardware processors to facilitate monitoring and managing versioning changes to computational workflows. The machine-readable instructions may include one or more computer program components. The one or more computer program components may include one or more of a detection component, an identification component, a user interface component, a presentation component and/or other components The electronic storage may be configured to store a workflow repository, a user repository, and/or other information. The workflow repository may include workflow definitions, computational modules, and/or other information. The workflow definitions may define computational workflows by specifying computational modules and/or relative orders of computational modules to configure the computational workflows. Computational modules may define separate sets of operations to perform on module inputs to the computational modules to generate module outputs. The user repository may include information specifying users, computational workflows associated with individual ones of the users, and/or other information. By way of non-limiting illustration, the workflow repository may include a first workflow definition defining a first computational workflow. The first workflow definition may specify a first computational module to configure the first computational workflow. The user repository may include information that specifies a first user, and the first user may be associated with the first computational workflow.

The detection component may be configured to monitor the workflow repository to detect changes to computational modules included in the workflow repository. Changes may include updates to the computational modules and/or other information stored in the workflow repository. By way of non-limiting illustration, a first change to the first computational module may be detected.

The identification component may be configured to, responsive to detections of changes to the computational modules, identify computational workflows defined by workflow definitions impacted by the detected changes. Workflow definitions impacted by the detected changes may include individual workflow definitions that specify computational modules impacted by the detected changes. By way of non-limiting illustration, the first computational workflow may be identified, responsive to the first change being detected and/or the first workflow definition specifying the first computational module.

The identification component may be configured to identify, based on information included in the user repository, users associated with the identified computational workflows. By way of non-limiting illustration, the first user may be identified as being associated with an identified computational workflow. The identified computational workflow may be the first computational workflow.

The user interface component may be configured to manage information defining user interfaces associated with individual users and/or other information. An individual user interface may be associated with an individual user. The user interfaces may include interface elements and/or other information. The interface elements may correspond to detected changes that impact computational workflows associated with the individual users. By way of non-limiting illustration, information may define a first user interface associated with the first user.

The user interface component may be configured to update the information defining the user interfaces based on the detected changes, the identified users, and/or other information. By way of non-limiting illustration, responsive to the first change being detected, information defining the first user interface may be updated to include a first interface element. The first interface element may correspond to the first change to the first computational module.

The presentation component may be configured to effectuate presentation of the user interfaces to the users. By way of non-limiting illustration, the first user interface may be presented to the first user to reflect changes to the workflow repository.

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
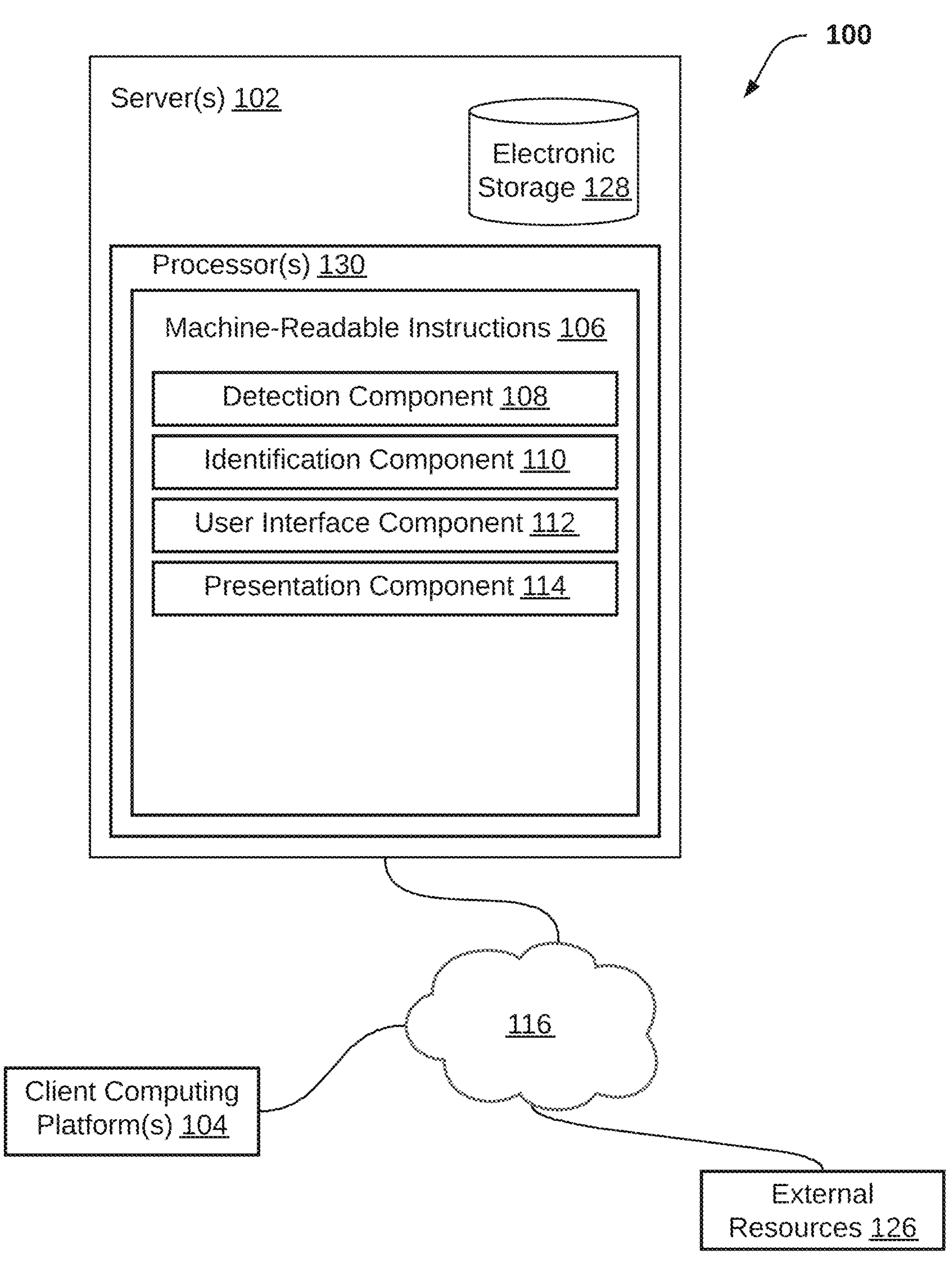
FIG. 1 illustrates a system for monitoring and managing versioning changes to computational workflows caused by ongoing development of computational modules implemented within the computational workflows, in accordance with one or more implementations.

FIG. 1 illustrates a system 100 configured for monitoring and managing versioning changes to computational workflows caused by ongoing development of computational modules implemented within the computational workflows, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of detection component 108, identification component 110, user interface component 112, presentation component 114, and/or other instruction components.

Electronic storage 128 may be configured to store a workflow repository, a user repository, and/or other information. The workflow repository may include workflow definitions, computational modules, and/or other information. The workflow definitions may define computational workflows by specifying computational modules and/or relative orders of computational modules to implement and/or configure the computational workflows. Computational modules may define separate sets of operations to perform on module inputs to the computational modules to generate module outputs. Computational workflows may be used to process input information sets to generate output information sets. Generating the output information sets may include processing input information sets in accordance with the workflow definitions. Computational workflows may receive input information sets and/or other information. The sets of operations defined by the computational modules may be performed on the input information sets in an order according to the relative orders of computational modules specified by the workflow definitions. In some implementations, relative orders of computational modules may include one or more sets of adjacent computational modules. The adjacent computational modules may include a providing computational module and a receiving computational module. Module outputs produced by the providing computational module and/or information derived thereof may be provided as module input to the receiving computational module. The set of operations defined by the receiving computational module may be performed on the module input to the receiving computational module (i.e., the module output from the providing computational module).

Individual ones of the computational modules may be configured to perform transformations, conversions, analysis, and/or other types of processes on module input(s) to the computational module to produce module output(s). By way of non-limiting illustration, individual computational modules may include sets of computational operations to perform on module inputs having a first format to produce module outputs having a second format. The first format may be different than the second format. In some implementations, computational modules may be obtained (i.e., imported) from external resources 126, via network(s) 116, and/or other components of system 100.

The user repository may include information specifying users, computational workflows associated with individual ones of the users, and/or other information. By way of non-limiting illustration, the workflow repository may include a first workflow definition defining a first computational workflow. The first workflow definition may specify a first computational module to configure the first computational workflow. The user repository may include information that specifies a first user, and may further specify first user is associated with the first computational workflow.

In some implementations, the workflow repository and/or the user repository may be a distributed repository that may be accessed by one or more users. By way of non-limiting illustration, the distributed repository may be a GitHub repository, a Mercurial repository, and/or other types of repositories. In some implementations, the workflow repository may store some or all previous changes to the workflow definitions and/or computational modules. Changes to a workflow definition may include changes to one or more computational modules specified by the workflow definition. In some implementations, one or more changes to a workflow definition may generate a new version of the computational workflow defined by the workflow definitions and/or a new version of the workflow definition. Some or all previously generated versions of the computational workflow and/or workflow definition may be included (i.e., stored) in the workflow repository. Previously generated versions of the computational workflow may be obtained and/or used by a user to process input information set(s) to generate output information set(s).

In some implementations, changes (e.g., versioning changes) to the workflow repository may be submitted (i.e., uploaded) by one or more users via one or more client computing platform(s) 104 associated with the users. Users may be capable of obtaining (i.e., checking out) one or more workflow definitions and/or computational modules for modification. The modified workflow definitions and/or computational modules may be submitted (i.e., checked-in, uploaded, etc.) to the workflow repository. In some implementations, submissions from users may indicate changes to individual workflow definitions and/or computational modules. By way of non-limiting illustration, the submissions may include one or more executable files and/or other components. Executing the executable files may implement the indicated changes to the workflow repository.

Detection component 108 may be configured to monitor the workflow repository to detect changes to computational modules, workflow definitions, and/or other information included in the workflow repository. In some implementations, a detection of changes may be responsive to receipt of update information by detection component 108 and/or other components of system 100. Update information may be submitted by one or more users via one or more client computing platform(s) 104, obtained from external resources 126, via network(s) 116, and/or other components of system 100. The update information may indicate the change(s) to the workflow definitions and/or the computational modules included in the workflow repository. In some implementations, a detection of changes may be responsive to a modification of the workflow definitions and/or computational modules included in the workflow repository. The modification may include the implementation (i.e., execution) of changes indicated by the updated information submitted by the users. In other words, a detection of change may be responsive to a submission of first update information and/or the implementation of versioning changes indicated by the first update information to the workflow repository (i.e., the workflow definitions and/or computational modules included in the workflow repository). The changes indicated by the first update information may be implemented automatically responsive to the submission of first update information, approval by one or more administrative users (i.e., users having administrative permissions), and/or other actions.

In some implementations, versioning changes to the computational modules may include modifications to the set of computational operations defined by the computational modules. Modifications (i.e., updates) to an individual set of computational operations may include adding additional operations, removing operations, modifying the order of the operations, and/or other types of modifications. The modified computational modules may replace earlier versions of the same computational modules in the workflow repository. The modified computational module may be stored in the workflow repository as a new version and/or be stored alongside with the earlier versions of the same computational module. In some implementations, a computational module and a modified version of the same computational module may be functionally analogous.

In some implementations, changes to the workflow definitions may include modifications to the relative order of computational modules specified by the workflow definitions. Modifications (i.e., updates) to the relative order of computational modules may include adding computational modules, removing computational modules, rearranging the order of computational modules, and/or other types of modifications. The modified workflow definitions may replace earlier versions of the same workflow definitions in the workflow repository. The modified workflow definitions may be stored in the workflow repository as a new version and/or be stored alongside with the earlier versions of the same workflow definitions.

In some implementations, monitoring the workflow repository may include scanning (i.e., inspecting, examining) the workflow repository and/or contents of the workflow repository to generate a repository record. The repository record may include information related to the workflow definitions and/or computational modules included in the workflow repository. Information related to the workflow definitions and/or computational modules may include version information, state information, and/or other information. The repository record may be stored in electronic storage 128 and/or other components of system 100. The workflow repository may be scanned at regular intervals of time. The intervals may be every minute, every ten minutes, every hour, every 12 hours, every 24 hours, and/or other intervals of time. Scanning the workflow repository may include comparing the newly generated repository record with one or more previously generated and/or stored repository records. A detection of changes may be responsive to detected differences between the newly generated repository record and the one or more stored repository records. By way of non-limiting illustration, a newly generated repository record may be compared to a stored repository record that was last and/or most recently generated.

Identification component 110 may be configured to, responsive to detections of changes to the computational modules and/or workflow definitions, identify computational workflows defined by workflow definitions impacted by the detected changes. In some implementations, identifying computational workflows may include identifying the workflow definitions included in the workflow repository that are impacted by the detected changes. In some implementations, computational workflows may be identified based on the workflow definitions that define the computational workflows. The detected changes may include detection component 108 receiving update information that indicates (i.e., specifies) modifications to be made to the workflow repository. The detected changes may also include the implementation of modification(s) to the workflow repository.

Workflow definitions impacted by the detected changes may include individual workflow definitions that specify computational modules impacted by the detected changes. By way of non-limiting illustration, a given computational module included in the workflow repository may be impacted by a detected change. Responsive to the detection of change impacting the given computational module, one or more workflow definitions stored in the workflow repository that specify the given computational module may be identified. Workflow definitions impacted by the detected changes may include individual workflow definitions that specify relative orders of computational modules impacted by the detected changes. By way of non-limiting illustration, the first computational workflow may be identified, responsive to a second change to the first workflow definition being detected. The second change to the first workflow definition may include changes and/or modifications to the relative order of computational modules specified by the first workflow definition.

Identification component 110 may be configured to identify, based on information included in the user repository, users associated with the identified computational workflows. The user repository may include information specifying one or more users. The specified users may have access permissions to the workflow repository and/or be capable of obtaining the workflow definitions and/or computational modules included in the workflow repository. In some implementations, an individual user being associated with an individual computational workflow may indicate the individual user having used the individual computational workflow to process data prior to the detection of changes. Processing data may include the individual user obtaining the computational workflow (e.g., obtaining the workflow definition that defines the computational workflow and/or configuring the computational workflow in accordance with the workflow definition) and/or processing an input information set with the computational workflow to generate an output information set. By way of non-limiting illustration, the first user may be identified as being associated with an identified computational workflow. The identified computational workflow may be the first computational workflow.

The user repository may include information related to the specified users' activity (e.g., interaction(s) with the workflow repository) and/or other information. The users' activity may determine associations between individual ones of the users and computational workflows defined by workflow definitions included in the workflow repository. An individual user's activity may include obtaining, utilizing, modifying, and/or creating one or more workflow definitions and/or computational modules included in the workflow repository. In some implementations, an individual user's activity and/or interaction with a computational workflow, workflow definition, and/or computational module must meet or exceed a threshold in order for the individual user to be associated with the computational workflow, workflow definition, and/or computational module. By way of non-limiting illustration, the user repository may include information specifying the first user and/or the first user's activity. The first user's activity may indicate a number of times the first user has used the first computational workflow to process input information sets. The first user may be associated with the first computational workflow responsive to the number meeting and/or exceeding a threshold. The threshold may indicate one time, 5 times, 10 times, and/or other numbers of uses of the first computational workflow by the first user.

User interface component 112 may be configured to manage information defining user interfaces associated with individual users and/or other information. In some implementations, information defining user interfaces associated with individual users may be stored in electronic storage 128 and/or other components of system 100. Information defining user interfaces may be based on information stored in the workflow repository, user repository, and/or other components of system 100. An individual user interface may be associated with an individual user. The user interfaces may include interface elements and/or other components. The interface elements may correspond to detected changes that impact computational workflows associated with the individual users. In some implementations, the interface elements corresponding to detected changes to the workflow repository may be selectable by the user associated with the user interface. Selection of an interface element corresponding to a detected change may facilitate expansion (e.g., a drop-down window, popup window) of the interface element to reveal information related to the detected change. Selection of an interface element corresponding to the detected change may facilitate implementing the detected changes to a local repository associated with the user and/or facilitate other actions. The interface elements corresponding to detected changes may convey the detected changes to the user in a human-readable format. By way of non-limiting illustration, user interface component 112 may be configured to manage information defining a first user interface associated with the first user.

In some implementations, the user interfaces may include interface elements corresponding to one or more computational workflows associated with the individual users. The interface elements corresponding to the computational workflows may be selectable by the user. Selection of an individual interface element may facilitate use of the corresponding computational workflow to process an input information set and/or facilitate other actions. In some implementations, the user interfaces may include interface elements corresponding to one or more output information sets generated by the users associated with the user interfaces. By way of non-limiting illustration, the first user interface may an interface element corresponding to a first output information set. The first output information set may have been generated by the first user and/or by processing a first input information set with the first computational workflow. The interface element corresponding to a first output information set may include information specifying the first computational workflow, the first workflow definition, and/or other information related to the generation of the first output information set. For example, other information related to the generation of the first output information set may include the date of generation, the time of generation, a version number associated with the first computational workflow, and/or information specifying the first input information set.

User interface component 112 may be configured to update information defining the user interfaces based on the detected changes, identified users, and/or other information. By way of non-limiting illustration, responsive to the first change being detected, information defining the first user interface may be updated to include a first interface element. The first interface element may correspond to the first change to the first computational module. The first interface element may be presented within and/or included in the first user interface near an interface element corresponding to the first computational workflow and/or other interface elements.

In some implementations, information defining the user interfaces may be updated at regular intervals of time. The intervals of time may include 1 minute, 10 minutes, 1 hour, 24 hours, and/or other intervals of time. In some implementations, information defining the user interfaces may be updated to include interface elements corresponding to detected changes to the workflow repository. The detected changes may be detected during the interval of time occurring immediately before the information defining the user interfaces is updated. Information defining the user interfaces may be updated to include interface elements that display summaries (i.e., reports) of one or more detected changes that are detected during the interval of time occurring immediately before the information defining the user interfaces is updated. The interface elements corresponding to detected changes may convey the detected changes to the user in a human-readable format.

In some implementations, information defining user interfaces may be updated responsive to the generation of a repository report and/or subsequent to a scan of the workflow repository. Information defining the user interfaces may be updated at regular intervals of time. The intervals of time may include 1 minute, 10 minutes, 1 hour, 24 hours, and/or other intervals of time. In some implementations, information defining the user interfaces may be updated to include interface elements corresponding to detected changes to the workflow repository. The detected changes may be detected during the interval of time occurring immediately before the information defining the user interfaces is updated. Information defining the user interfaces may be updated to include interface elements that display summaries (i.e., reports) of one or more detected changes that are detected during the interval of time occurring immediately before the information defining the user interfaces is updated. The intervals may be the same as or similar to the interval(s) for scanning (i.e., inspecting, examining) the workflow repository and/or contents of the workflow repository. By way of non-limiting illustration, information defining the first user interface may be updated to specify the differences between a newly generated repository report and a stored repository record that was last and/or most recently generated.

Presentation component 114 may be configured to effectuate presentation of the user interfaces to the users. By way of non-limiting illustration, the first user interface may be presented to the first user to reflect the changes to the workflow repository. In some implementations, an individual user interface associated with an individual user may include interface elements corresponding to detected changes that impact one or more computational workflows associated with the individual user.

In some implementations, the interface elements included in the user interface(s) may provide the associated users with the option to download and/or locally (i.e., via one or more client computing platform(s) 104) store the modified version of the identified computational workflow (i.e., including the detected changes) and/or the workflow definitions and computational modules impacted by the detected changes.

Figure 3:
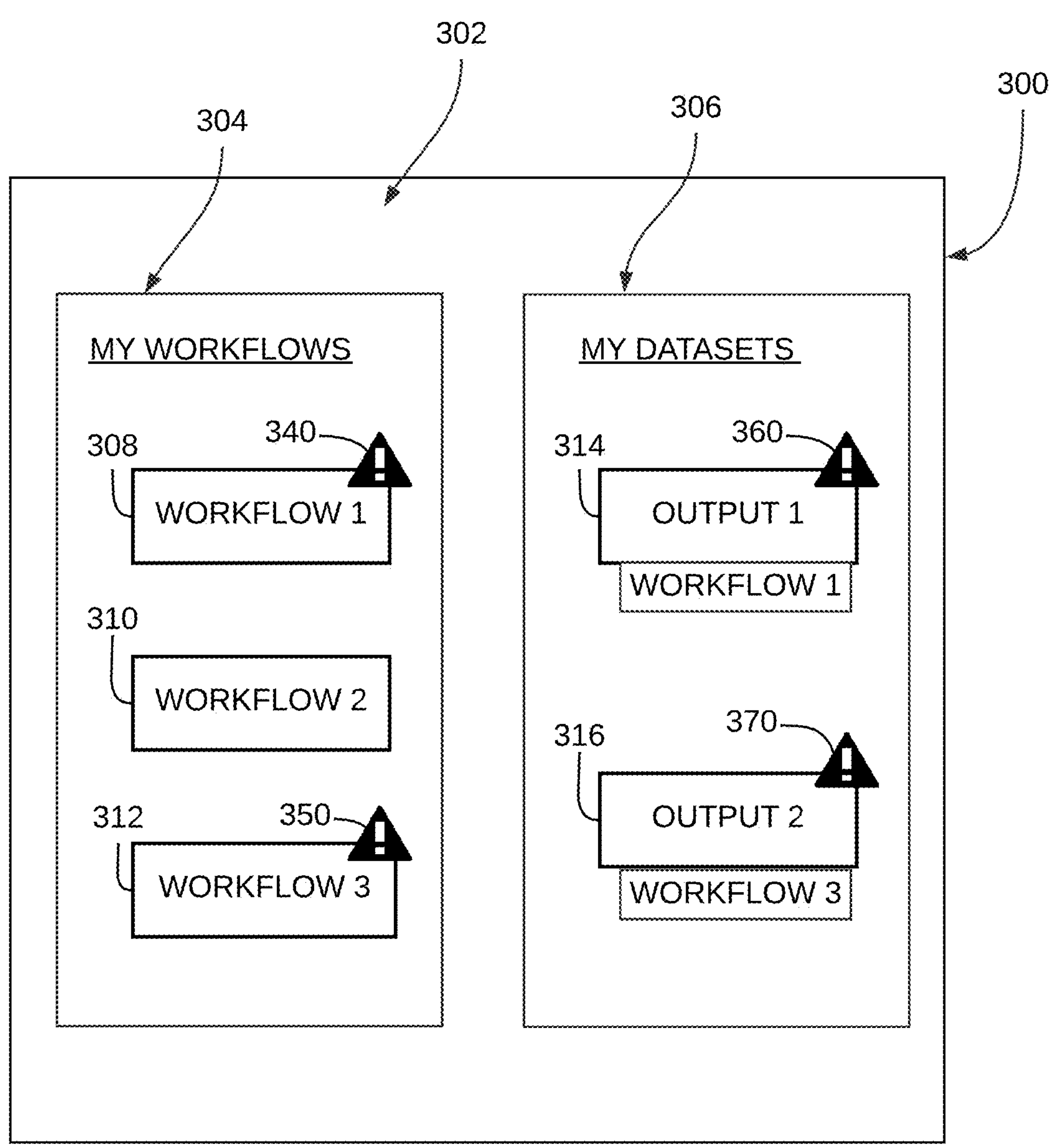
FIG. 3 illustrates a user interface, in accordance with one or more implementations.

FIG. 3 illustrates an exemplary user interface 300 that may be used by a system to monitor and manage versioning changes to computational workflows caused by ongoing development of computational modules implemented within the computational workflows, in accordance with one or more implementations. User interface 300 may present a dashboard 302 to a user via a client computing platform associated with the user. Dashboard 302 may include a first region 304, a second region 306, and/or other interface elements. First region 304 may include one or more interface elements representing one or more computational workflows and/or other information. The represented computational workflows may include computational workflows associated with the user. First region may include a first interface element 308, a second interface element 310, a third interface element 312, and/or other interface elements. First interface element 308 may represent a first computational workflow, second interface element 310 may represent a second computational workflow, and third interface element 312 may represent a third computational workflow. In some implementations, the interface elements may be selectable by the user. Selection of an interface element may facilitate use of the corresponding computational workflow to process input information sets and/or other information.

Second region 306 may include one or more interface elements representing one or more output information sets associated with the user. The output information sets may have been generated by one or more of the computational workflows represented by the interface elements included in first region 304. Second region 306 may include a fourth interface element 314, a fifth interface element 316, and/or other interface elements. Fourth interface element 314 may represent a first output information set. The first output information set may have been generated by processing an input information set with the first computational workflow. Fifth interface element 316 may represent a second output information set. The second output information set may have been generated by processing an input information set with the third computational workflow.

In some implementations, dashboard 302 may include one or more notification elements and/or other types of interface elements. Dashboard 302 may include a first notification element 340, a second notification element 350, a third notification element 360, a fourth notification element 370, and/or other notification elements. First notification element 340 may indicate detected changes to the first computational workflow and/or a workflow definition that defines the first computational workflow. Second notification element 350 may indicate detected changes to the third computational workflow and/or a workflow definition that defines the third computational workflow. The workflow definitions defining the first and second computational workflows may be stored in a workflow repository. In some implementations, notifications may indicate output information sets generated by computational workflows defined by workflow definitions impacted by the detected changes. Third notification element 360 may be presented responsive to the detected changes to the first computational workflow. Fourth notification element 370 may be presented responsive to the detected changes to the third computational workflow.

Referring to FIG. 1, server(s) 102, client computing platform(s) 104, and/or external resources 126 may be operatively linked via one or more electronic communication links. By way of non-limiting illustration, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. By way of non-limiting illustration, server(s) 102 may be implemented by a cloud of computing platforms operating together as server(s) 102.

Electronic storage 128 may comprise non-transitory storage media that electronically stores information. In some implementations, electronic storage 128 may be configured to store one or more of the updated workflow definitions to configure the first computational module, the updated computational module, the second output information set, the variance information, and/or other information. In some implementations, the first output information set may be stored in association with the first workflow definition. The second output information set may be stored in association with the updated workflow definition. In some implementations, the updated workflow definition may be stored as a second version of the first workflow definition to configure the first computational workflow.

The electronic storage media of electronic storage 128 may include one or both of system storage that is provided integrally (i.e., substantially non-removable) with server(s) 102 and/or removable storage that is removably connectable to server(s) 102 via, By way of non-limiting illustration, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. By way of non-limiting illustration, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
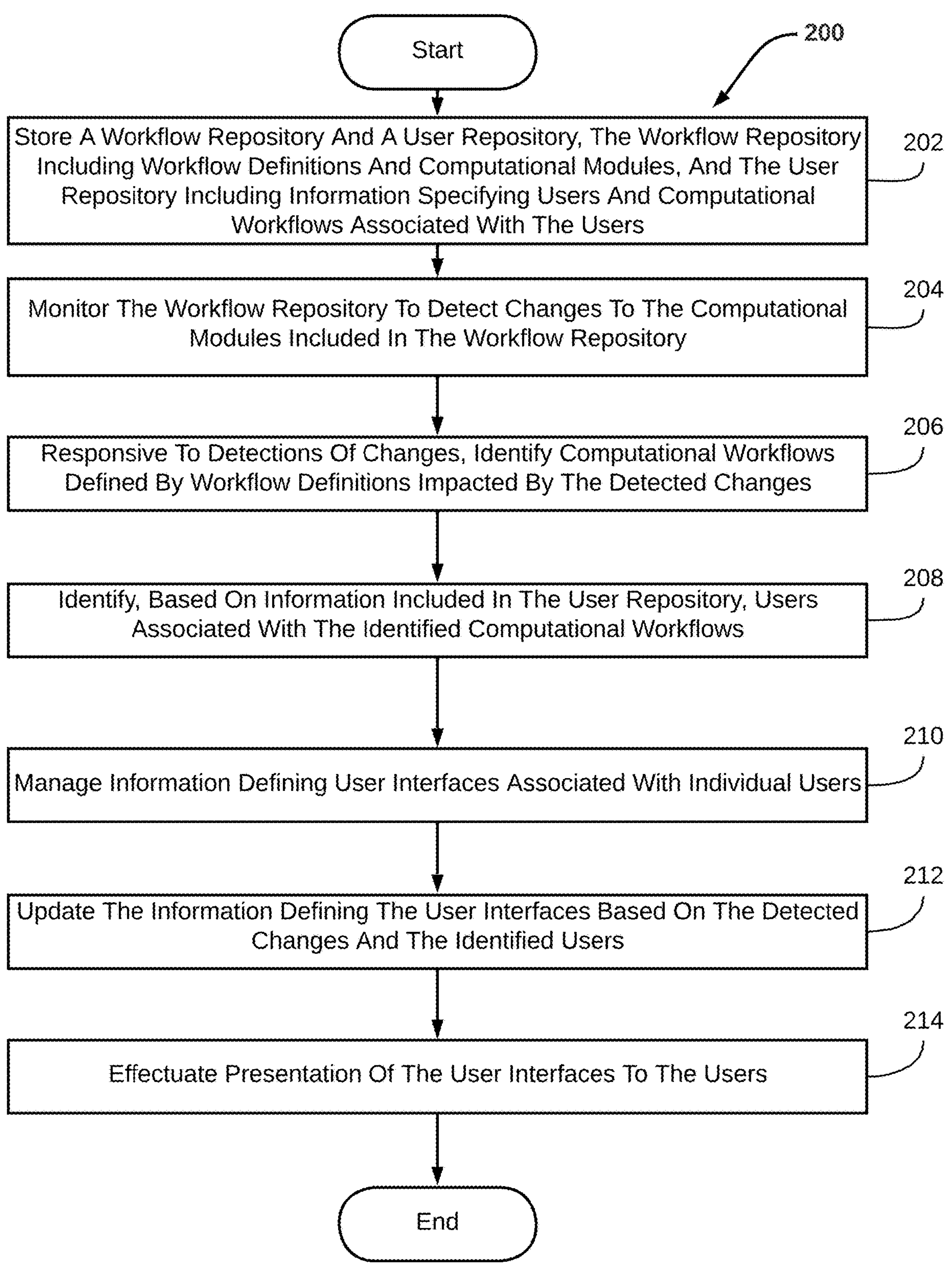
FIG. 2 illustrates a method for monitoring and managing versioning changes to computational workflows caused by ongoing development of computational modules implemented within the computational workflows, in accordance with one or more implementations.

FIG. 2 illustrates a method 200 for monitoring and managing versioning changes to computational workflows caused by ongoing development of computational modules implemented within the computational workflows, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing a workflow repository, a user repository, and/or other information. The workflow repository may include workflow definitions, computational modules, and/or other information. The workflow definitions may define computational workflows by specifying computational modules and/or relative orders of computational modules to configure the computational workflows. Computational modules may define separate sets of operations to perform on module inputs to the computational modules to generate module outputs. The user repository may include information specifying users, computational workflows associated with individual ones of the users, and/or other information. By way of non-limiting illustration, the workflow repository may include a first workflow definition defining a first computational workflow. The first workflow definition may specify a first computational module to configure the first computational workflow. The user repository may include information that specifies a first user and the first user may be associated with the first computational workflow. Operation 202 may be performed by a component that is the same as or similar to electronic storage 128, in accordance with one or more implementations.

An operation 204 may include monitoring the workflow repository to detect changes to computational modules included in the workflow repository. Changes may include updates to the computational modules and/or other information stored in the workflow repository. By way of non-limiting illustration, a first change to the first computational module may be detected. Operation 204 may be performed by one or more hardware processors configured by machine-readable instructions including a component that is the same as or similar to detection component 108, in accordance with one or more implementations.

An operation 206 may include, responsive to detections of changes to the computational modules, identifying computational workflows defined by workflow definitions impacted by the detected changes. Workflow definitions impacted by the detected changes may include individual workflow definitions that specify computational modules impacted by the detected changes. By way of non-limiting illustration, the first computational workflow may be identified, responsive to the first change being detected and/or the first workflow definition specifying the first computational module. Operation 206 may be performed by one or more hardware processors configured by machine-readable instructions including a component that is the same as or similar to identification component 110, in accordance with one or more implementations.

An operation 208 may include identifying, based on information included in the user repository, users associated with the identified computational workflows. By way of non-limiting illustration, the first user may be identified as being associated with an identified computational workflow. The identified computational workflow may be the first computational workflow. Operation 208 may be performed by one or more hardware processors configured by machine-readable instructions including a component that is the same as or similar to identification component 110, in accordance with one or more implementations.

An operation 210 may include managing information defining user interface associated with individual users and/or other information. An individual user interface may be associated with an individual user. The user interfaces may include interface elements and/or other information. The interface elements may correspond to detected changes that impact computational workflows associated with the individual users. By way of non-limiting illustration, information may define a first user interface associated with the first user. Operation 210 may be performed by one or more hardware processors configured by machine-readable instructions including a component that is the same as or similar to user interface component 112, in accordance with one or more implementations.

An operation 212 may include updating the information defining the user interfaces based on the detected changes, the identified users, and/or other information. By way of non-limiting illustration, responsive to the first change being detected, information defining the first user interface may be updated to include a first interface element. The first interface element may correspond to the first change to the first computational module. Operation 212 may be performed by one or more hardware processors configured by machine-readable instructions including a component that is the same as or similar to user interface component 112, in accordance with one or more implementations.

An operation 214 may include effectuating presentation of the user interfaces to the users. By way of non-limiting illustration, the first user interface may be presented to the first user to reflect changes to the workflow repository. Operation 214 may be performed by one or more hardware processors configured by machine-readable instructions including a component that is the same as or similar to presentation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. By way of non-limiting illustration, it is to be understood that the present technology contemplates that, to the extent possible, one or more features of any implementation can be combined with one or more features of any other implementation.

What is claimed:

1. A system configured to monitor and manage versioning changes to computational workflows caused by ongoing development of computational modules implemented within the computational workflows, the system comprising:

electronic storage that stores a workflow repository, wherein the workflow repository includes workflow definitions and computational modules, wherein the workflow definitions specify relative orders of the computational modules to configure the computational workflows, wherein the computational modules define separate sets of computational operations to perform on module inputs to the computational modules to generate module outputs, wherein individual ones of the computational modules are specified by multiple workflow definitions, wherein individual ones of the computational workflows are associated with individual users;

one or more physical processors configured by machine-readable instructions to:

receive update information from an administrative user, wherein the update information specifies modifications to the sets of computational operations defined by the computational modules, such that first update information specifies modifications to a first set of computational operations defined by a first computational module;

modify the stored computational modules in accordance with the update information, such that the first computational module is modified in accordance with the first update information;

responsive to updating the computational modules, analyze the workflow repository to identify computational workflows defined by workflow definitions that specify the modified computational modules, such that a first computational workflow defined by a first workflow definition that specifies the first computational module is identified;

manage information defining user interfaces associated with individual users associated with the stored computational workflows, wherein the user interfaces include interface elements corresponding to computational modules specified by the computational workflows associated with the individual users, such that information defining a first user interface associated with a first user is managed; and update, based on the update information, the information defining the user interfaces associated with the individual users associated with the identified computational workflows, such that responsive to the first computational module being modified, the information defining the first user interface is updated to include a first interface element indicating the modifications to the first computational module.

2. The system of claim 1, wherein a given user being associated with a given computational workflow indicates the given user previously created the given computational workflow and/or the given user has utilized the given computational workflow to generate workflow output.

3. The system of claim 2, wherein the given user is associated with the given computational workflow based on a number of times the given user has used the given computational workflow, such that the number of times meets or exceeds a threshold.

4. The system of claim 1, wherein the administrative user possesses administrative permissions to modify stored computational modules.

5. The system of claim 1, wherein modifying the stored computational modules includes modifying the sets of computational operations defined by the stored computational modules.

6. The system of claim 5, wherein modifying the computational modules further includes adding computational operations, removing computational operations, and modifying the order of the sets of computational operations.

7. The system of claim 1, wherein the update information is submitted by the administrative user via a client computing platform associated with the administrative user.

8. The system of claim 1, wherein the one or more physical processors are further configured by machine-readable instructions to:

effectuate notifications to the individual users responsive to updates to the information defining the user interfaces associated with the individual users associated with the identified computational workflows, wherein the notifications are provided via the user interfaces.

9. The system of claim 1, wherein the one or more physical processors are further configured to:

generate a repository record for the stored workflow repository, wherein the repository record includes information related to the workflow definitions and/or computational modules, and wherein the repository record specifies the modifications to the computational modules; and provide the repository record to the administrative user.

10. The system of claim 1, wherein the modified computational modules are stored in electronic storage as new versions of the computational modules.

11. A method for monitoring and managing versioning changes to computational workflows caused by ongoing development of computational modules implemented within the computational workflows, the method comprising:

storing a workflow repository, wherein the workflow repository includes workflow definitions and computational modules, wherein the workflow definitions specify relative orders of the computational modules to configure the computational workflows, wherein the computational modules define separate sets of computational operations to perform on module inputs to the computational modules to generate module outputs, wherein individual ones of the computational modules are specified by multiple workflow definitions, wherein individual ones of the computational workflows are associated with individual users;

receiving update information from an administrative user, wherein the update information specifies modifications to the sets of computational operations defined by the computational modules, such that first update information specifies modifications to a first set of computational operations defined by a first computational module;

modifying the stored computational modules in accordance with the update information, such that the first computational module is modified in accordance with the first update information;

responsive to updating the computational modules, analyzing the workflow repository to identify computational workflows defined by workflow definitions that specify the modified computational modules, such that a first computational workflow defined by a first workflow definition that specifies the first computational module is identified;

managing information defining user interfaces associated with individual users associated with the stored computational workflows, wherein the user interfaces include interface elements corresponding to computational modules specified by the computational workflows associated with the individual users, such that information defining a first user interface associated with a first user is managed; and updating, based on the update information, the information defining the user interfaces associated with the individual users associated with the identified computational workflows, such that responsive to the first computational module being modified, the information defining the first user interface is updated to include a first interface element indicating the modifications to the first computational module.

12. The method of claim 11, wherein a given user being associated with a given computational workflow indicates the given user previously created the given computational workflow and/or the given user has utilized the given computational workflow to generate workflow output.

13. The method of claim 12, wherein the given user is associated with the given computational workflow based on a number of times the given user has used the given computational workflow, such that the number of times meets or exceeds a threshold.

14. The method of claim 11, wherein the administrative user possesses administrative permissions to modify stored computational modules.

15. The method of claim 11, wherein modifying the stored computational modules includes modifying the sets of computational operations defined by the stored computational modules.

16. The method of claim 15, wherein modifying the computational modules further includes adding computational operations, removing computational operations, and modifying the order of the sets of computational operations.

17. The method of claim 11, wherein the update information is submitted by the administrative user via a client computing platform associated with the administrative user.

18. The method of claim 11, wherein the method further comprises:

effectuating notifications to the individual users responsive to updates to the information defining the user interfaces associated with the individual users associated with the identified computational workflows, wherein the notifications are provided via the user interfaces.

19. The method of claim 11, wherein the method further comprises:

generating a repository record for the stored workflow repository, wherein the repository record includes information related to the workflow definitions and/or computational modules, and wherein the repository record specifies the modifications to the computational modules; and providing the repository record to the administrative user.

20. The method of claim 11, wherein the modified computational modules are stored as new versions of the computational modules.

* * * * *